United States Patent [19]

Yamanaka et al.

[11] Patent Number: 5,027,334

[45] Date of Patent: Jun. 25, 1991

[54] MAGNETO-OPTICAL DISK DEVICE WITH MOVABLE COIL

[75] Inventors: Toshihiro Yamanaka, Ikoma; Tetsuyuki Takemoto, Nara; Masahiro Horii, Nara; Shoji Taniguchi, Nara, all of Japan

[73] Assignee: Sharp Kabushiki Kaisha, Osaka, Japan

[21] Appl. No.: 334,149

[22] Filed: Apr. 6, 1989

[30] Foreign Application Priority Data

Apr. 7, 1988 [JP] Japan .................... 63-87654

[51] Int. Cl.$^5$ ................ G11B 13/04; G11B 11/12; G11B 11/10
[52] U.S. Cl. ..................... 369/13; 360/114; 360/59
[58] Field of Search ............ 369/13, 77.2, 75.2; 360/114, 59; 365/122

[56] References Cited

U.S. PATENT DOCUMENTS

| 4,908,809 | 3/1990 | Tadokoro et al. ............ 360/59 X |
| 4,914,647 | 4/1990 | Ono et al. .................... 369/77.2 |

FOREIGN PATENT DOCUMENTS

| 60-226044 | 11/1985 | Japan ............................ 369/13 |
| 61-11977 | 1/1986 | Japan ............................ 369/13 |
| 61-115256 | 6/1986 | Japan . | |
| 61-170940 | 8/1986 | Japan . | |
| 62-185269 | 8/1987 | Japan ........................ 360/114 |
| 2192750 | 1/1988 | United Kingdom . | |

OTHER PUBLICATIONS

Copy of English Abstract of Japanese Publication No. 60-251541.
Copy of English Abstract of Japanese Publication No. 63-121149.
Hara et al., "Hardware Design for High Performance 130 mm Optical Disk Storage System", Review of the Electrical Communications Laboratories, vol. 36, No. 2, Mar., pp. 253-260.
N. Kikuchi et al., "An Erasable, CD-Compatible Magneto Optical Disk Recorder", Audio Engineering Society 76 Convention, New York, Oct. 8, 1984, pp. 1-16.

*Primary Examiner*—Stuart S. Levy
*Assistant Examiner*—Hoa T. Nguyen
*Attorney, Agent, or Firm*—Sandler, Greenblum & Bernstein

[57] ABSTRACT

A magneto-optical disk device for receiving a magneto-optical disk housed in a cassette and for driving the magneto-optical disk by a disk drive motor to read/write the disk is disclosed. The device includes a movable cassette carrier having a top plate for receiving the cassette therein, a read/write head located under the cassette carrier, a magnetic field coil slidably mounted on the top plate above the read/write head to move in a direction parallel to the movement of the read/write head, a pole extending substantially perpendicular from the read/write head at a position offset from the cassette carrier, and an arm having one end slidably mounted on the pole and other end fixedly connected to the magnetic field coil. The arm is mounted to slide along the pole to move the magnetic field coil along a direction substantially perpendicular to the disk.

5 Claims, 4 Drawing Sheets

MAGNETO-OPTICAL DISK DEVICE WITH MOVABLE COIL

BACKGROUND OF THE INVENTION

1. Field of the Invention

The present invention relates to a magneto-optical disk device.

2. Description of the Prior Art

Magneto-optical disk devices such as are conventionally known are shown in FIG. 1 and FIG. 2.

The magneto-optical disk device shown in FIG. 1 is a device in which the magnetic field coil 22 which applies a magnetic field to one side of the magneto-optical disk 21 is integrated with an optical head 23 which irradiates the other side of the magneto-optical disk 21 by means of a laser emission port 24. This integrated assembly slides parallel to the surface of the magneto-optical disk in the directions indicated by the arrows. The magnetic field coil 22 and laser emission port 24 sandwich the magneto-optical disk 21 from mutually opposing positions so that a magnetic field is applied by the magnetic field coil 22 to that part of the magneto-optical disk irradiated by the laser.

The magneto-optical disk device shown in FIG. 2 is a device in which the magnetic field coil 32 is mounted to, for example, a cassette holder (not shown in the figure) for the magneto-optical disk 31, and is of a size large enough to apply a magnetic field to the entire media area of the magneto-optical disk. The optical head 33 slides, as does the optical head in the device shown in FIG. 1, parallel to the surface of the disk such that laser light from the laser emissions port 34 irradiates the magneto-optical disk 31.

However, because the magneto-optical disk is typically of a cassette type, sufficient space is required in a direction perpendicular to the magneto-optical disk surface in order to load the disk. Thus, in a magneto-optical disk device as shown in FIG. 1, space for cassette loading is required between magnetic field coil 22 and the magneto-optical disk 21, and between laser emission port 24 and the magneto-optical disk 21. Thus, with such a spacing, magnetic field coil 22 cannot be positioned any closer than a fixed distance from the magneto-optical disk. Therefore, the magnetic field coil must be of a size sufficiently large to apply, from this fixed position, a magnetic field of the required strength to magneto-optical disk 21. Thus, this magnetic field coil cannot be made smaller and the weight cannot be further reduced, and the access speed of the optical head therefore becomes slower.

Furthermore, as to the arrangement of FIG. 2, because the magnetic field coil 32 is mounted to the cassette holder and moves in conjunction with the cassette during cassette loading, extra cassette loading space between the magnetic field coil 32 and magneto-optical disk is not required in a magneto-optical disk device, but the magnetic field coil 32 must be of a size sufficient to apply a magnetic field to the entire media area of the magneto-optical disk. Thus, the current flowing through the coil is greater, the amount of heat created is greater, and the power consumption is greater.

SUMMARY OF THE INVENTION

The present invention has been developed with a view to substantially solving the above described disadvantages and has for its essential object to provide an improved magneto-optical disk device of the type in which the magnetic field coil and optical head are integrated and slide in conjunction with each other such that the magnetic field coil can be brought close to the magneto-optical disk and the size and weight of the magnetic field coil can be minimized.

In accomplishing these and other objects, a magneto-optical disk device, according to the present invention, for receiving a magneto-optical disk housed in a cassette and for driving the magneto-optical disk by a disk drive motor to read/write the disk, comprises a movable cassette carrier having a top plate for receiving the cassette therein, a read/write head located under the cassette carrier, a magnetic field coil slidably mounted on the top plate above the read/write head to move in a direction parallel to the movement of the read/write head, a pole extending approximately perpendicular from the read/write head at a position offset from the cassette carrier, and, an arm having one end slidably mounted on the pole and the other end fixedly connected to the magnetic field coil.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
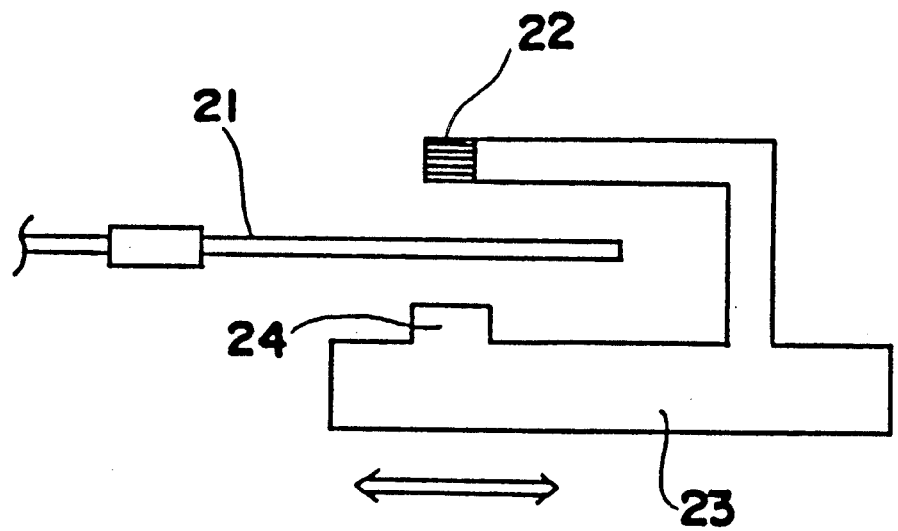
FIGS. 1 and 2 are diagrammatic views of magneto-optical disk devices of the prior art.
Figure 2:
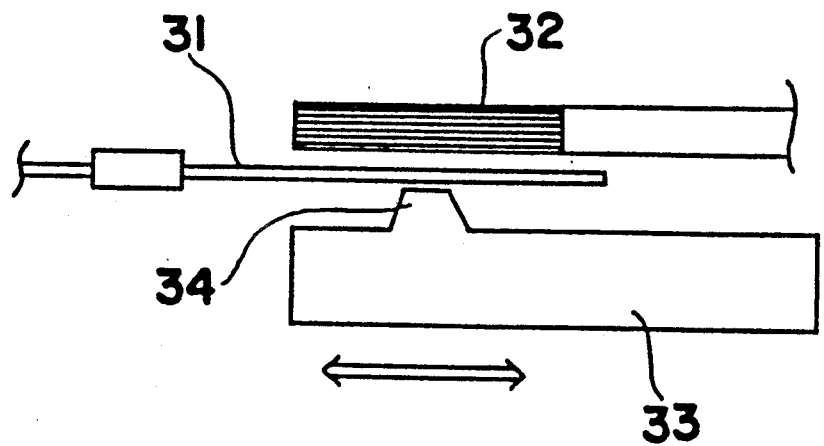
Figure 3:
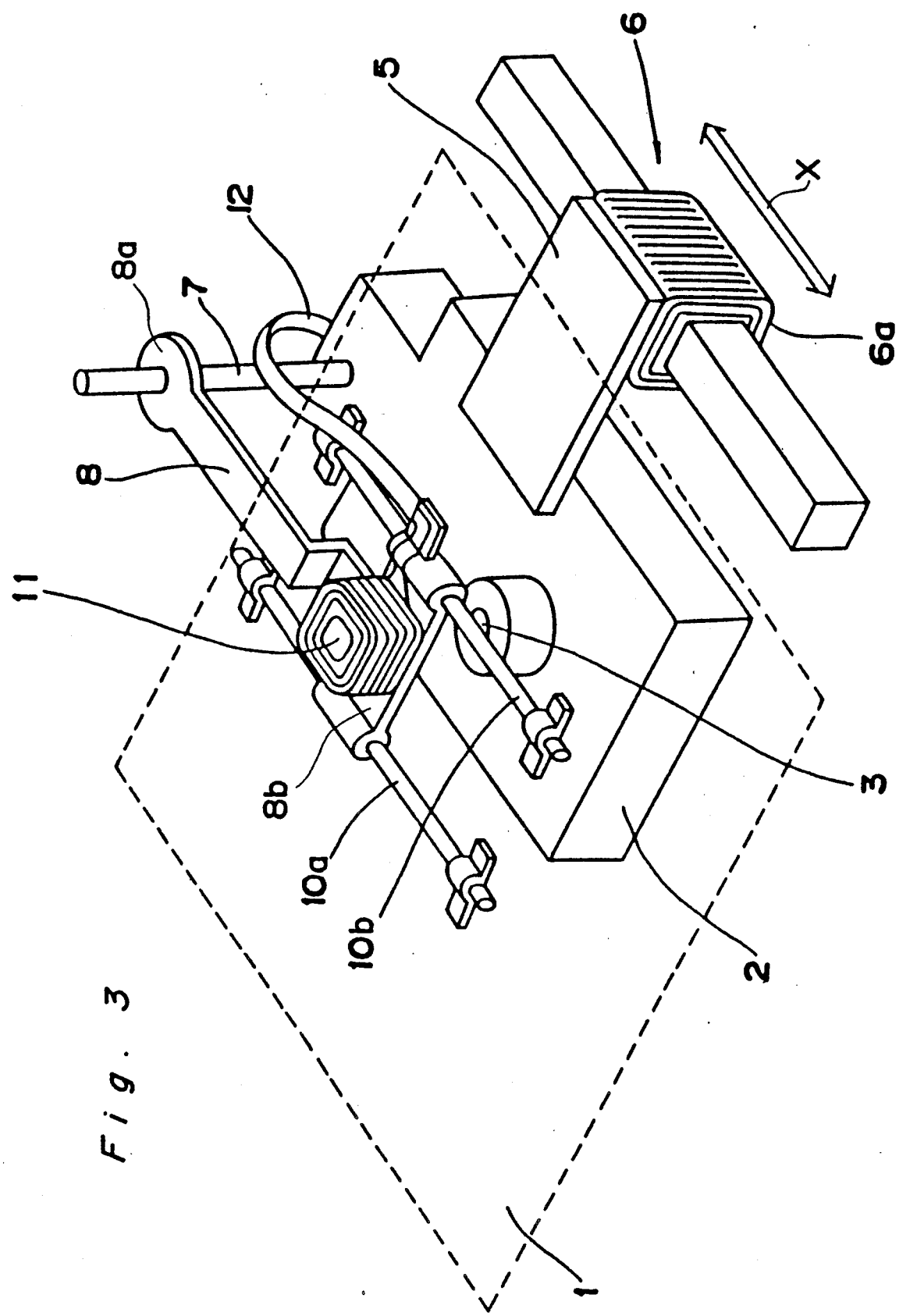
FIG. 3 is a diagrammatic view of essential parts of a preferred embodiment of a magneto-optical disk device according to the present invention.
Figure 4:
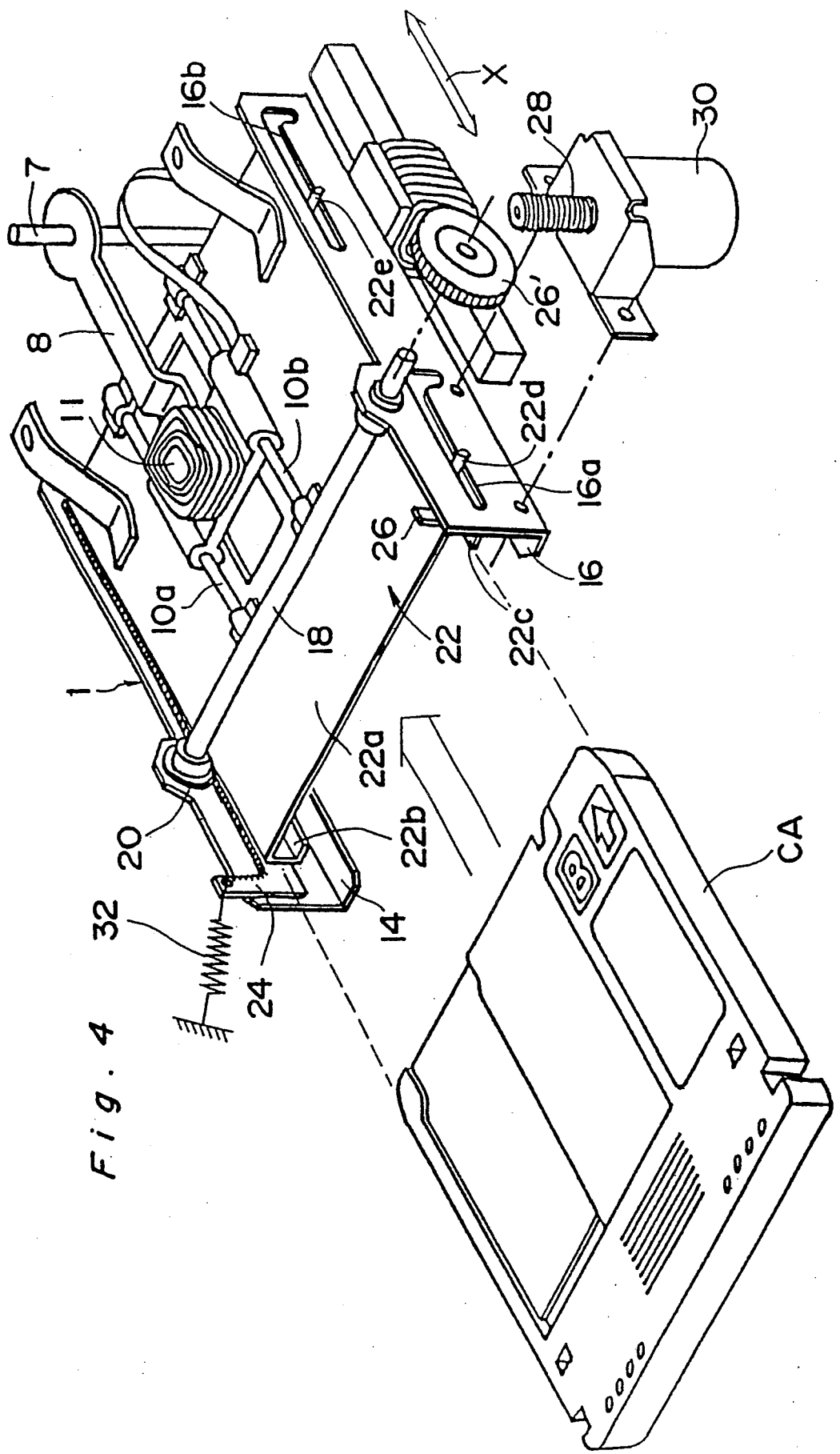
FIG. 4 is a perspective view of a preferred embodiment of a magneto-optical disk device of FIG. 3.

Referring to FIG. 3, reference number 1 is a cassette holder for a magneto-optical disk, a detail of which will be described later in connection with FIG. 4, and 2 is a read/write head having a laser emission port 3 located under the cassette holder 1. The read/write head 2 is an optical head which irradiates the bottom surface of an inserted magneto-optical disk from laser emission port 3 to write information on the magneto-optical disk or to read information from the disk. The read/write head 2 has a horizontal arm member 5 which extends outwardly and supports coil 6a of a linear motor 6, so that the movement of coil 6a as indicated by the arrow X makes read/write head 2 slide in the same directions parallel to the surface of cassette holder 1.

Furthermore, a solid pole 7, serving as a first support member, is fixedly and substantially vertically mounted at one end portion of read/write head 2. A coil holder 8, which is a second support member, has a hole formed at one end 8a thereof so that coil holder 8 is slidably mounted on the solid pole 7. Thus, coil holder 8 may slide in a direction perpendicular to the surface of cassette holder 1. The other end 8b of coil holder 8 has a T-shaped section slidably supported by two parallel guide rods 10a and 10b which are fixedly mounted on cassette holder 1, as will be described in detail later in connection with FIG. 4. Each of guide rods 10a and 10b extends in the direction of read/write head 2 travel (the directions indicated by the arrow X) so that coil holder 8 slides along the guide rods freely in the direction of the arrow X together with the read/write head 2.

A magnetic field coil 11 is mounted on T-shaped section 8b such that the axis of coil 11 is aligned with the axis of laser emission port 3. Magnetic field coil 11, when excited, applies a magnetic field to the surface of a loaded magneto-optical disk. To excite coil 11 for magnetic field generation, electric current is supplied to magnetic field coil 11 by means of flexible cable 12. Coil holder 8 is tiered or stepped such that a portion connected to T-shaped section 8b is elevated so that portion is held away from the magneto-optical disk to avoid any influence of the magnetic force to the disk.

Referring to FIG. 4, a detail of cassette holder 1 is shown which comprises opposite side plates 14 and 16 which are fixedly connected to a casing of a disk player (not shown). Each side plate, such as side plate 16, is formed with two L-shaped grooves 16a and 16b, each groove having a long groove portion extending parallel to arrow X and a short groove portion extending perpendicular to arrow X at the right end (when viewed in FIG. 4) of the long groove portion. Each side plate also has a circular opening formed closely adjacent the upper side edge thereof for receiving a shaft 18. Thus, shaft 18 is rotatably inserted in said circular openings and extends between side plates 14 and 16. A gear 20 is fixedly mounted on shaft 18 adjacent side plate 14. A similar gear is provided on shaft 18 adjacent side plate 16.

Provided between side plates 14 and 16 is a cassette carrier plate 22 having a top plate 22a on which guide rods 10a and 10b are fixedly mounted by suitable holders provided at opposite ends of each rod. Cassette carrier plate 22 also has side rails 22b and 22c at opposite sides adjacent side plates 14 and 16 so as to slidingly receive a cassette CA between the rails.

L-shaped gear plate 24 and 26 are fixedly attached to the side rails 22b and 22c, respectively. Each gear plate, such as 24, has gear teeth formed along the upper side face of the longer portion extending parallel to rail 22b and also on the side face of the short portion extending perpendicularly to rail 22b. The gear teeth formed on plate 24 engages gear 20, thus forming a rack and pinion arrangement. The same rack and pinion arrangement is provided on the opposite rail 22c.

Pins 22d and 22e are fixedly mounted on rail 22c extending outwardly through grooves 16a and 16b. Similar pins are fixedly mounted on other rail 22b in a similar manner.

Fixedly mounted on one end of shaft 18 is a worm wheel gear 26' which engages a worm gear 28 mounted on a motor 30. Motor 30 is firmly mounted on side plate 16. Thus, when motor 30 is activated, shaft 18 rotates to rotate pinion 20. Thus, since pinion 20 engages the long rack portion extending parallel to arrow X, cassette carrier plate 22, together with plates 24 and 26, moves in the direction of arrow X relative to side plates 14 and 16, and then, when pinion 20 engages the short upright rack portion, the cassette carrier plate 22 moves downwardly towards read/write head 2. In order to return the cassette carrier plate 22 to the original position, motor 30 rotates in the reverse direction, or a suitable return spring 32 is provided.

Figure 5A:
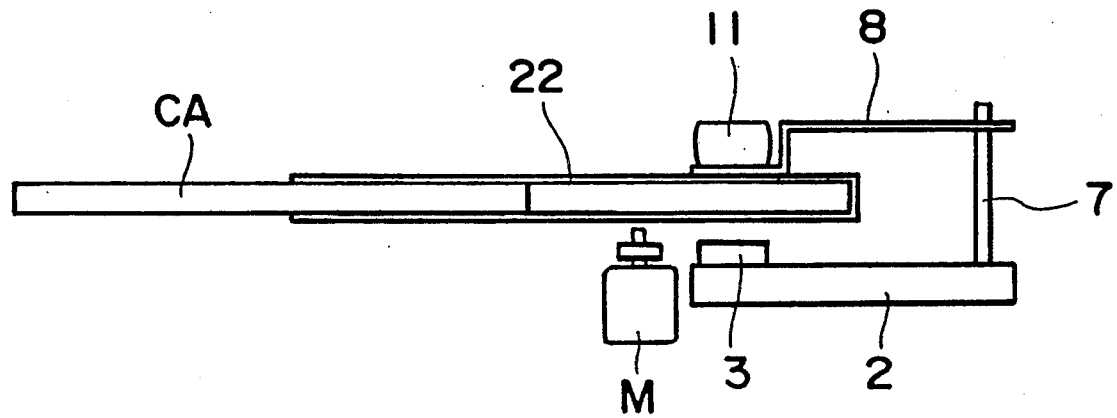
FIGS. 5a, 5b and 5c are diagrammatic views, showing the movements of the cassette holder carrying a magnetic field coil, according to the present invention.
Figure 5B:
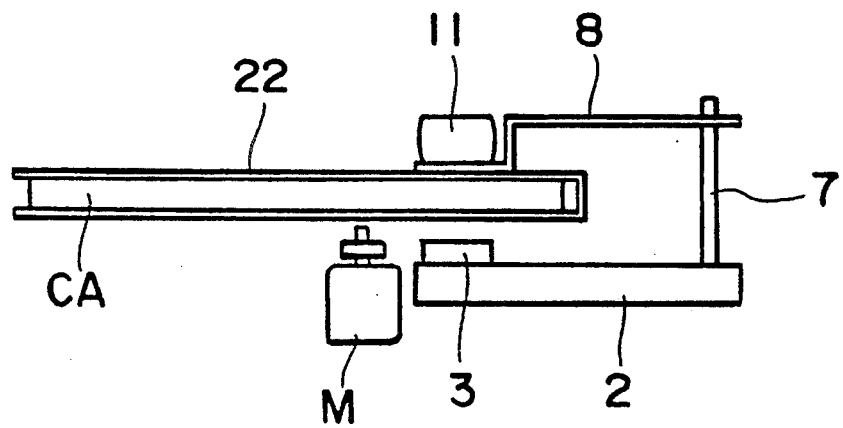
Figure 5C:
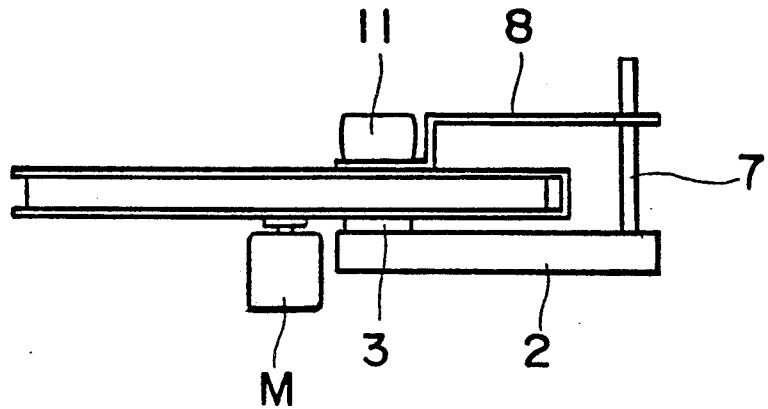

In operation, after inserting the magneto-optical disk (cassette CA) in cassette carrier plate 22, as diagrammatically shown in FIGS. 5a and 5b, motor 30 rotates in the forward direction, so that, cassette carrier plate 22 is moved toward pole 7 so that the magneto-optical disk is above a disk drive motor M, that is, the axis of the magneto-optical disk is approximately in alignment with the axis of the disk drive motor M, and then, the cassette carrier plate 22 is further moved downward, as the pins 22d and 22e are guided along grooves 16a and 16b. Accordingly, cassette CA is shifted to a loaded position, as shown in FIG. 5c, in which the disk engages the motor M. By the downward movement of cassette carrier plate 22, magnetic field coil 11 also moves down by the sliding of coil holder 8 along pole 7. Thus, cassette CA is held closely between magnetic field coil 11 and laser emission port 3.

During the play or recording of the disk, read/write head 2 slides in the direction of the arrow X by linear motor 6, so that laser emission port 3 and magnetic field coil 11, closely sandwiching the cassette CA, move together in the radial direction of the disk. The recording is carried out such that the magneto-optical disk is irradiated by laser light from the laser emission port 3 of read/write head 2, and a magnetic field is also applied by magnetic field coil 11 to that part of the magneto-optical disk irradiated by the laser light.

According to the present invention, since coil holder 8 to which is mounted magnetic field coil 11 descends in conjunction with cassette holder 1, magnetic field coil 11 can be brought in close juxtaposition to the magneto-optical disk. Therefore, the coil can be made smaller when compared with that of a conventional magneto-optical disk device in which a loading space is required between the non-descending magnetic field coil and the magneto-optical disk. As a result, the weight of the magnetic field coil is reduced, and the access speed is increased. Furthermore, because the coil impedance is reduced, the magnetic field inversion rate and application rate are increased, and a high frequency enabling data overwriting can be achieved. Moreover, the current flowing through the magnetic field coil is reduced, and heat generation and power consumption are reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A magneto optical disc device comprising:
   a magnetic field coil which applies a magnetic field to a magneto-optical disc;
   an optical head which slides parallel to the face of the magneto optical disc;
   a first support member which supports said magnetic field coil;
   a second support member which is mounted to said optical head and supports said first support member in such a manner said first member is able to slide in a direction perpendicular to the face of the magneto optical disc, whereby said first support member and said magnetic field coil are raised, via said second support member, at the beginning of the insertion of the magneto-optical disc, are then lowered toward a position adjacent said magneto-optical disc during playing and recording of the optical disc, and are raised at the end of the ejection of the magneto optical disc.

2. A magneto-optical disk device for receiving a magneto-optical disk housed in a cassette and for driving said magneto-optical disk by a disk drive motor to read-write said disk, said magneto-optical disk device comprising:

a cassette carrier having a top plate member for receiving said cassette therein;

a first driving means for driving said cassette carrier to a position above said disk drive motor and to lower said cassette carrier so as to have said cassette in engagement with said motor;

read-write head means located under said cassette carrier;

second driving means for driving said read-write head means to move in a direction parallel to a face of said top plate member;

a magnetic field coil slidably mounted on said top plate member above said read-write head means to move in a direction parallel to the movement of said read-write head means; and elevation connection means for connecting said read-write head means with said magnetic field coil such that said magnetic field coil is maintained above said read-write head means after said cassette carrier lowered and during the movement of said read-write head means by said second driving means.

3. A magneto-optical disk device as claimed in claim 2, wherein said read-write head means comprises a laser emission port.

4. A magneto-optical disk device as claimed in claim 2, wherein said elevation connecting means comprises a pole extending substantially perpendicular from said read-write head means at a position offset from said cassette carrier, and the arm having one end slidably mounted on said pole and other end fixedly connected to said magnetic field coil.

5. A magneto-optical disk device as claimed in claim 4, wherein said arm is being raised above said top plate member.

* * * * *